March 11, 1947.    G. W. HARVEY    2,417,250
FLEXIBLE JOINT
Filed April 17, 1945

INVENTOR.
GEORGE W. HARVEY.
BY
ATTORNEY.

Patented Mar. 11, 1947

2,417,250

UNITED STATES PATENT OFFICE 2,417,250

FLEXIBLE JOINT

George W. Harvey, Glenburn, Calif., assignor to Solar Aircraft Company, San Diego, Calif., a corporation of California Application April 17, 1945, Serial No. 588,809

5 Claims. (Cl. 285—92)

This invention relates to flexible joints of the ball and socket type for use particularly in lines carrying hot gases at positive pressure and is particularly useful in the exhaust lines or conduits of airplane engines.

An object of the invention is to provide simple, light and leak-proof flexible joints for use in lines carrying corrosive gases or gases at extreme temperatures.

A more specific object is to provide a flexible joint of the ball and socket type for use in a line conveying gases at super-ambient pressure in which the nested ball and socket surfaces are protected from the gases conveyed without the use of packing, despite clearance between the nested surfaces.

Another specific object is to provide a ball and socket joint for conveying gases at super-ambient pressures in which leakage of ambient air is induced between the sliding surfaces of the ball and socket to reduce the temperature of the surfaces and protect them from the gases being conducted.

Still another object is to provide a practicable ball and socket joint in which the socket member of the joint can be readily contracted and expanded into and out of nesting relation with the ball member.

Other more specific objects and features of the invention will become apparent from the detailed description to follow of certain preferred forms of the invention.

Considerable difficulty has been encountered in developing durable ball and socket joints for the exhaust lines of aeroplane engines because the hot exhaust gases within the joint, being at super-ambient pressures, always leaked through the clearance between the ball and socket members to a certain degree. This not only exposed the bearing surfaces of the ball and socket members to the corrosive action of the gases, but also heated them to a high temperature because the ball member was always directly exposed to the hot exhaust gases flowing therethrough. Leakage of hot exhaust gases from the joints also increased the fire hazard, increased the danger of exhaust gas getting into the cabin, and reduced the exhaust pressure available to operate a supercharger.

Heretofore attempts at lengthening the life of such joints have been directed to the selection of materials that would withstand the temperatures and corrosive gases and maintain smooth, low friction characteristics over the bearing surfaces of the ball and socket, or by the interposition between the ball and socket of some packing structure that would substantially prevent leakage.

The present invention differs essentially from previous solutions of the problem in that it functions to reduce or prevent flow of the exhaust gases into the clearance between the bearing surfaces of the joint and to greatly reduce the transfer of heat from the exhaust gases to the bearing surfaces. This reduces the tendency of the bearing surfaces to gall or freeze and allows smaller clearances to be used if desired.

Briefly, this result is achieved by so directing the gases through the ball and socket members of the joint that they tend to pass directly through the middle of the joint without directly contacting the spherical portions of the joint, and also by increasing the velocity of the gases through the joint to thereby reduce their pressure. It is frequently possible to decrease the pressure below the ambient pressure, thereby not only preventing leakage of the hot exhaust gases between the bearing surfaces of the joint, but actually inducing a reverse flow of air through the joint which tends to cool it. However, even if the pressure is not reduced below the ambient pressure, it reduces the extent of leakage of the hot exhaust gases and thereby reduces their corroding and heating effect on the joint.

Figure 1:
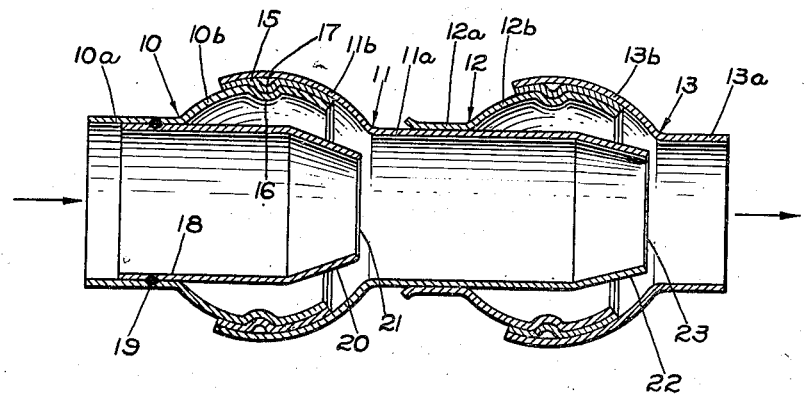
Fig. 1 is a longitudinal section showing one embodiment of the invention.

Referring first to Fig. 1, there is disclosed a double ball and socket joint consisting of four relatively slidable members 10, 11, 12 and 13, respectively. The member 10 is at the upstream end of the joint and consists of a tubular section 10a which is integral with a spherical section 10b. The section 11 has a spherical section 11b at its upstream end which is in nested relation with the spherical section 10b and has a tubular section 11a on its downstream end. The member 12 has a tubular section 12a on its upstream end which is in sliding relation with the tubular section 11a and has on its downstream end a spherical section 12b which is in nested relation with a spherical section 13b on the upstream end of the member 13. The tubular section 10a of the upstream member 10 is adapted to be secured to a conduit in any desired manner. Likewise, the downstream member 13 has a tubular section 13a which is adapted to be secured to another section of the conduit in which the joint is used.

There is positioned between the nested spherical sections 10b and 11b a zone-shaped packing 15 which may be of asbestos, or other fibrous, resilient material. This packing is preferably fixed relative to the inner spherical section 10b by forming registering annular grooves 16 and 17, respectively, at the equators of the spherical section 10b and the packing 15. A similar packing is interposed between the spherical sections 12b and 13b.

To reduce the pressure within the spherical sections 10b and 11b and prevent direct contact of the hot gases therewith, an inner tubular member 18 is secured to the tubular section 10a as by spot welds 19. This pipe 18 has a tapered outer end 20 which terminates in an orifice 21 of substantially smaller diameter than the diameter of the tubular section 10a so that the gases passing therethrough have their velocity substantially increased and their pressure correspondingly decreased in accordance with well known Venturi action. This reduces the pressure within the spherical sections 10b and 11b to a value that may be below the ambient or atmospheric pressure, so that if there is any leakage between the sliding sections 10b and 11b, it will be a leakage of air inwardly rather than a leakage of exhaust gas outwardly.

The gas stream projected at high velocity from the orifice 21 enters the tubular section 11a and the discharge end of this is also of reduced section, as indicated at 22, to provide a discharge orifice 23 through which the gas is projected into the tubular section 13a at high velocity and reduced pressure to create a reduced pressure within the spherical sections 12b and 13b.

The orifice 23 is preferably of larger diameter than the orifice 21 as otherwise it would produce a back pressure that would largely overcome the reduction in pressure that the orifice 21 tends to create. In other words, if the orifices 21 and 23 were of the same diameter, the reduction in pressure within the spherical sections 12b and 13b would be substantially greater than that within the spherical sections 10b and 11b. By suitably proportioning the orifice 23 somewhat larger than the orifice 21, equal pressure drops can be obtained within both the spherical sections 10b and 11b and the spherical sections 12b and 13b.

Figure 2:
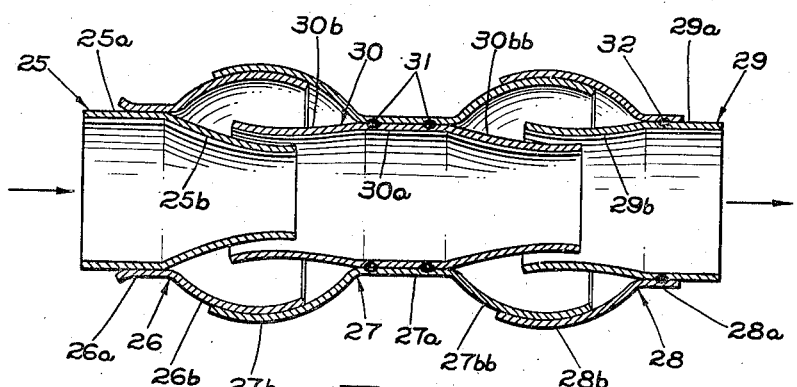
Fig. 2 is a longitudinal section similar to that of Fig. 1 but showing a modified structure.

Referring now to Fig. 2, the joint therein disclosed comprises five relatively movable members 25, 26, 27, 28 and 29, respectively. The member 25 is at the upstream end and consists of a tubular section 25a having a gradually reduced section 25b at its downstream end. The member 26 comprises a tubular section 26a which is in sliding relation with the tubular section 25a and a spherical section 26b which is in nested sliding relation with a spherical section 27b at the upstream end of the member 27. The member 27 comprises a middle tubular portion 27a which interconnects the spherical section 27b on the upstream end with a spherical section 27bb on the downstream end. The spherical section 27bb is in sliding nested relation with a spherical section 28b constituting the upstream section of the member 28, which has at its downstream end a tubular section 28a which is secured to the tubular section 29a as by spot weld 32, at the downstream end of the member 29. The member 29, like the member 25, has a tapered portion 29b extending into the associated spherical sections 27bb and 28b.

The member 27 includes an inner tubular member 30 having a middle cylindrical section 30a which is fitted within and secured to the tubular section 27a, as by spot welds 31, and tapered end sections 30b and 30bb. The tapered section 30b extends within the spherical sections 26b and 27b into overlapping relation with the section 25b and is of sufficiently larger diameter to permit substantial angular movement of the joint without contacting the section 25b. Similarly, section 30bb extends into the spherical sections 27bb and 28b and into the reduced section 29b, but is of smaller diameter than the latter to permit angular movement of the joint without contact between sections 30bb and 29b.

The structure of Fig. 2 has the advantage over that of Fig. 1 in that relatively small clearances can be used between the sections 25b and 30b and between the sections 30bb and 29b because the overlapping portions of those members are positioned near the centers of the associated ball and socket members. With this construction it is often possible to produce a flow of air between the bearing surfaces of the spherical sections 26b and 27b and thence through the clearances between the sections 25b and 30b so that exhaust gas is kept completely away from the spherical bearing surfaces. A similar inflow of air is produced between the spherical surfaces 27bb and 28b.

As in the structure of Fig. 1, the orifices of sections 30bb and 29b are preferably of somewhat larger diameter than the orifices of sections 25b and 30b so as to produce substantially equal pressures within both ball joints.

Whereas, in the structure of Fig. 1 longitudinal movement is accommodated by the relatively slidable sections 11a and 12a, such longitudinal movement is accommodated in the structure of Fig. 2 by sliding movement between sections 25a and 26a and between sections 28a and 29a, section 25a being secured directly to a conduit at one end of the joint and section 29a being secured directly to the conduit at the other end of the joint.

Figures 3, 4:
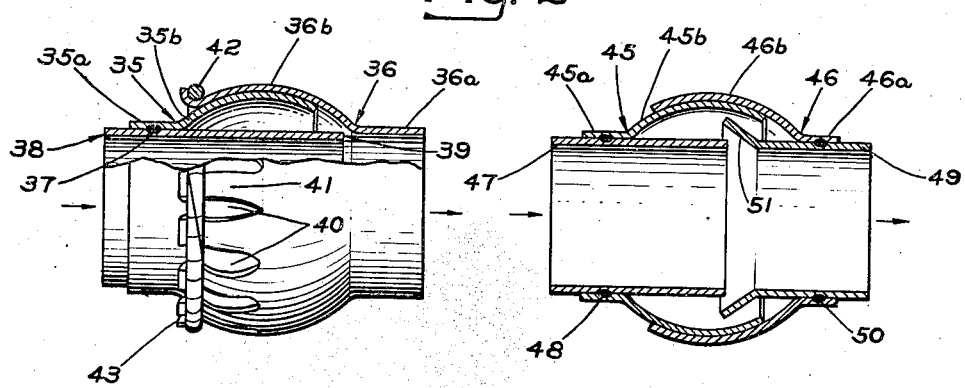
Fig. 3 is a view partly in side elevation and partly in section showing a modified socket structure alternative to the socket structure shown in Figs. 1 and 2.
Fig. 4 is a longitudinal section showing a single ball and socket joint somewhat different from the structures of Figs. 1 and 2.

Fig. 3 shows a single ball joint construction in which one member 35 has a tubular section 35a adapted to be connected to one conduit and a spherical section 35b in nested relation with the spherical section 36b of a second member 36, the latter having a tubular section 36a adapted to be connected to another conduit. There is connected to the tubular section 35a, as by spot welds 37, an inner tubular section 38 which extends into the spherical section of the joint to a point just short of the tubular section 36a so that when the joint bends, the inner end 39 of the member 38 will clear the surface of the spherical section 36b. Normally this inner tubular section 38 directs the exhaust gas directly into the tubular section 36a with very little circulation of the hot exhaust gas to the inner surfaces of the spherical sections 35b and 36b.

The outer spherical section 36b, instead of being solid as in the structures of Figs. 1 and 2, has slots 40 extending inwardly from its free end, which slots define a plurality of fingers 41 which, when the joint is assembled, are contracted about the inner spherical section 35b by a ring 42. The ring 42 is retained in position by the outer ends of the fingers 41 which are bent outwardly as indicated at 43. The ring 42 may be made of spring steel, and split, so that its ends can be spread apart far enough to permit slipping the ring over the ends 43 if it is desired to disassemble the spherical section 36b from the spherical section 35b.

The construction involving the slots 40, fingers 41 and the ring 42 has the advantage that the spherical section 36b can be completely formed prior to its assembly on the spherical section 35b, whereas in the construction shown in Figs. 1 and 2, the outer spherical section of each ball and socket joint must be shaped after its assembly on the inner spherical member.

It is to be understood that the construction of Fig. 3 can be employed in the double ball assemblies of Figs. 1 and 2.

The joint shown in Fig. 4 comprises two relatively movable members 45 and 46. The member 45 comprises a tubular section 45a adapted to be connected to one conduit section and a spherical section 45b which nests with a spherical section 46b of the member 46, the latter also having a tubular section 46a at its downstream end which is adapted to be secured to the other conduit section. The tubular section 45a of the upstream member is secured to an internal tubular member 47 which projects inwardly substantially to the center of curvature of the spherical sections, this member 47 being shown secured to the tubular section 45a by spot welds 48. Likewise an internal tubular member 49 is positioned within the tubular section 46a and secured thereto by spot welds 50. The inner end of the tubular member 49 is flared as indicated at 51 to receive the inner end of the tubular member 47.

Because the inner ends of both the internal tubular members are located near the center of curvature of the spherical surfaces, there is relatively little movement between them when the joint flexes, and the flared end 50 of the member 49 aids in collecting the gases discharged through the tubular member 47. As a result, little of the exhaust gas circulates against the inner surfaces of the spherical sections 45b and 46b and they are maintained at a much lower temperature than they otherwise would be.

Various departures from the exact structures disclosed will be obvious to those skilled in the art, and the invention is therefore to be limited only to the extent set forth in the appended claims.

I claim:

1. A flexible joint for use in a conduit conveying gases in one direction at pressures above the ambient pressure and comprising cooperating upstream and downstream hollow ball and socket members, each having a spherical section in sliding nesting relation with the spherical section of the other member, and a tubular section extending away from the spherical section, the tubular section of the upstream member being extended downstream into the spherical section of that member for directing the gases into the tubular section of the downstream member, and the tubular section of said downstream member being extended into the spherical section of that member and into overlapping relation with the said extended portion of said upstream member, said extended portion of the downstream member being of substantially larger diameter than the extended portion of the upstream member to permit substantial angular movement between said upstream and downstream members without contact between said extended portions thereof.

2. A flexible joint for use in a conduit conveying gases in one direction at pressures above the ambient pressure and comprising cooperating upstream and downstream hollow ball and socket members, each having a spherical section in sliding nesting relation with the spherical section of the other member, and a tubular section extending away from the spherical section, the tubular section of the upstream member being extended downstream into the spherical section of that member for directing the gases into the tubular section of the downstream member, and the tubular section of said downstream member being extended into the spherical section of that member and into overlapping relation with the said extended portion of said upstream member, said extended portion of the downstream member being of substantially larger diameter than the extended portion of the upstream member to permit substantial angular movement between said upstream and downstream members without contact between said extended portions thereof, and said extended portions of the upstream and downstream members being of substantially equal length, whereby their overlapping portions are symmetrically disposed with respect to the center of curvature of said spherical sections.

3. A flexible joint for use in a conduit conveying gases in one direction at pressures above the ambient pressure and comprising cooperating upstream and downstream hollow ball and socket members, each having a spherical section in sliding nesting relation with the spherical section of the other member, and a tubular section extending away from the spherical section, the tubular section of the upstream member being extended downstream into the spherical section of that member for directing the gases into the tubular section of the downstream member, said extended portion of the upstream member extending approximately to the center of said spherical sections and the tubular section of the downstream member extending into the spherical section of that member substantially to the center of curvature thereof and being of larger cross-section at its end and surrounding the orifice of said extended portion of the upstream member.

4. A flexible joint for use in a conduit conveying gases in one direction at pressure above the ambient pressure, said joint comprising four members, each consisting of a tubular section and a spherical section, a first of said members having its tubular section directed upstream and having its spherical section in nested relation with the tubular section of a second of said members, said second member having its tubular section directed downstream and in sliding relation with the tubular section of a third of said members, the third of said members having its spherical section in nested relation with the spherical section of the fourth of said members, and said fourth member having its tubular section directed downstream, said first member having its tubular section extended into its spherical section for directing gases into the tubular section of said second member, and said second member extending into the spherical section of said third member for directing gases into the tubular section of said fourth member.

5. A flexible joint as described in claim 4 in which the extended portions of said first and second members are tapered to a reduced cross section at their ends for increasing the velocity of the gases discharged therefrom and reducing their pressure, the cross-sectional dimension of the end of the tubular extension of said second member being larger than that of the extended portion of said first member.

GEORGE W. HARVEY.

REFERENCES CITED

The following references are of record in the file of this patent:

UNITED STATES PATENTS

| Number | Name | Date |
|---|---|---|
| 299,662 | Martin | June 3, 1884 |

FOREIGN PATENTS

| Number | Country | Date |
|---|---|---|
| 510,417 | French | Sept. 4, 1920 |
| 390,305 | German | Feb. 21, 1924 |
| 390,304 | German | Feb. 21, 1924 |
| 341,025 | German | Nov. 21, 1919 |